US012482625B2

(12) United States Patent
Greenland

(10) Patent No.: US 12,482,625 B2
(45) Date of Patent: *Nov. 25, 2025

(54) X-RAY TUBE ANODE WITH INTEGRATED COLLIMATOR

(71) Applicant: Moxtek, Inc., Orem, UT (US)

(72) Inventor: Kasey Otho Greenland, South Jordan, UT (US)

(73) Assignee: Moxtek, Inc., Orem, UT (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/794,903

(22) Filed: Aug. 5, 2024

(65) Prior Publication Data

US 2024/0395490 A1 Nov. 28, 2024

Related U.S. Application Data

(63) Continuation of application No. 17/746,103, filed on May 17, 2022, now Pat. No. 12,094,680.

(60) Provisional application No. 63/211,641, filed on Jun. 17, 2021.

(51) Int. Cl.
*H01J 35/14* (2006.01)
*H01J 35/18* (2006.01)

(52) U.S. Cl.
CPC .............. *H01J 35/14* (2013.01); *H01J 35/18* (2013.01)

(58) Field of Classification Search
CPC ...... H01J 35/14; H01J 35/18; H01J 2235/166; H01J 35/186; H01J 35/116; H01J 35/12; H01J 35/16; G21K 1/02
See application file for complete search history.

(56) References Cited

U.S. PATENT DOCUMENTS

| | | | | |
|---|---|---|---|---|
| 6,333,968 | B1 * | 12/2001 | Whitlock | B82Y 10/00 378/136 |
| 9,099,279 | B2 * | 8/2015 | Rommel | H01J 35/16 |
| 9,251,995 | B2 | 2/2016 | Ogura et al. | |
| 9,466,456 | B2 * | 10/2016 | Rommel | H01J 35/10 |
| 10,453,643 | B2 | 10/2019 | Peterson et al. | |
| 2017/0200580 | A1 * | 7/2017 | Miller | H01J 35/116 |
| 2017/0287673 | A1 * | 10/2017 | Peterson | H01J 35/186 |
| 2019/0132936 | A1 * | 5/2019 | Steck | H01J 35/112 |
| 2019/0341220 | A1 * | 11/2019 | Parker | H01J 35/12 |
| 2021/0043409 | A1 | 2/2021 | Parker et al. | |
| 2021/0385931 | A1 * | 12/2021 | Steck | H05G 1/02 |
| 2022/0093358 | A1 * | 3/2022 | Miller | H01J 35/18 |
| 2023/0282438 | A1 * | 9/2023 | Greenland | H01J 35/16 378/140 |
| 2024/0105415 | A1 * | 3/2024 | Nakayama | H05G 1/025 |

* cited by examiner

*Primary Examiner* — David P Porta
*Assistant Examiner* — Gisselle M Gutierrez
(74) *Attorney, Agent, or Firm* — Thorpe North & Western, LLP

(57) ABSTRACT

A collimator for an x-ray tube can be a monolithic, integral structure. The collimator can include a proximal-end closest to a cathode and a distal-end farthest from the cathode. The proximal-end can adjoin a vacuum inside of the x-ray tube. The distal-end can adjoin the air. The collimator can include an aperture extending therethrough. An x-ray window can be mounted across the aperture. The aperture can include a collimation-region between the x-ray window and the distal-end, and a drift-region between the x-ray window and the proximal-end. X-rays can be generated inside of the collimator.

20 Claims, 3 Drawing Sheets

X-RAY TUBE ANODE WITH INTEGRATED COLLIMATOR

CLAIM OF PRIORITY

This is a continuation of U.S. patent application Ser. No. 17/746,103, filed May 17, 2022; which claims priority to U.S. Provisional Patent Application No. 63/211,641, filed on Jun. 17, 2021, which are hereby incorporated herein by reference.

FIELD OF THE INVENTION

The present application is related to x-ray sources.

BACKGROUND

A large voltage between a cathode and an anode of the x-ray tube, and sometimes a heated filament, can cause electrons to emit from the cathode to the anode. The anode can include a target material. The target material can generate x-rays in response to impinging electrons from the cathode.

BRIEF DESCRIPTION OF THE DRAWINGS (DRAWINGS MIGHT NOT BE DRAWN TO SCALE)

Figure 1:
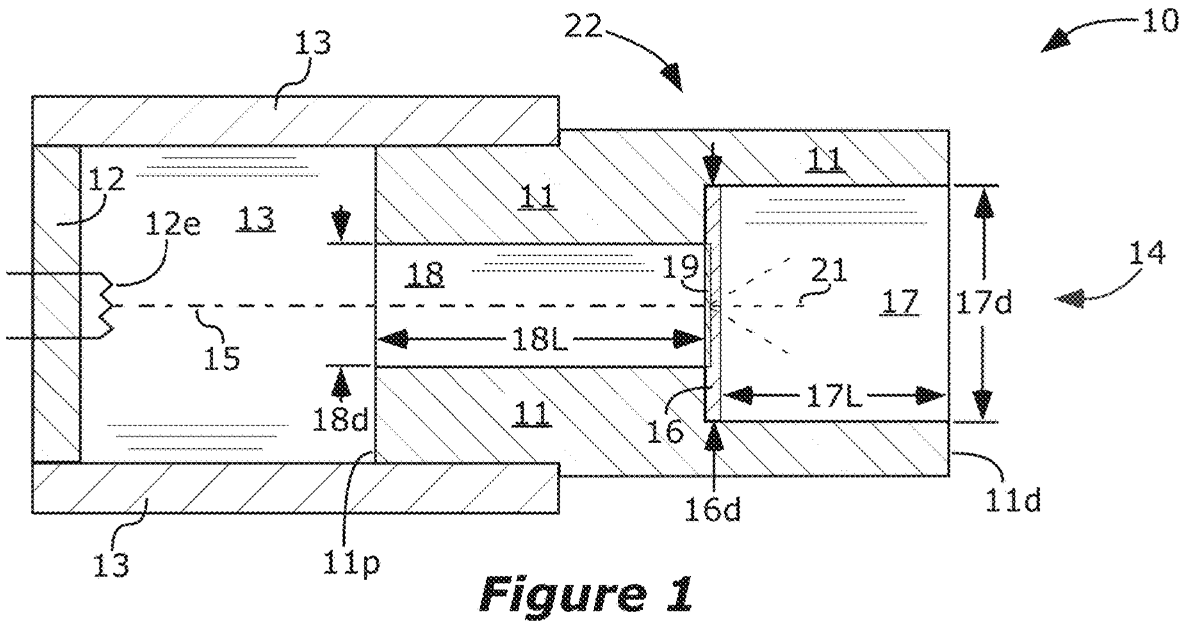

FIG. 1 is a cross-sectional side-view of a transmission target x-ray tube 10 with a collimator 11. A proximal-end 11*p* of the collimator 11 can adjoin a vacuum inside of the x-ray tube 10. A distal-end 11*d* of the collimator 11 can be exposed to and can adjoin the air. An aperture 14 of the collimator 11 can encircle a target material 19 of the x-ray tube 10.

Figure 2:
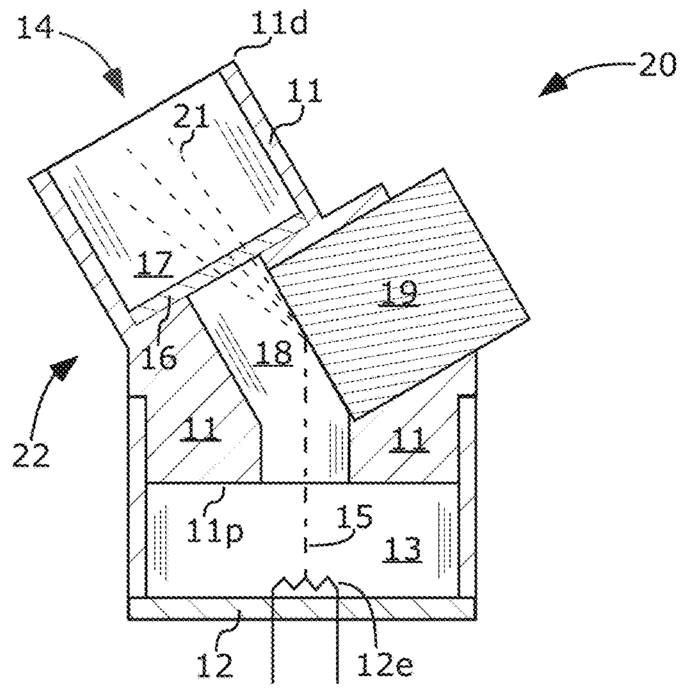

FIG. 2 is a cross-sectional side-view of a reflection target x-ray tube 20 with a collimator 11. A proximal-end 11*p* of the collimator 11 can adjoin a vacuum inside of the x-ray tube 10. A distal-end 11*d* of the collimator 11 can be exposed to and can adjoin the air. A target material 19 of the x-ray tube 20 can form part of a wall of an aperture 14 of the collimator 11.

Figure 3:
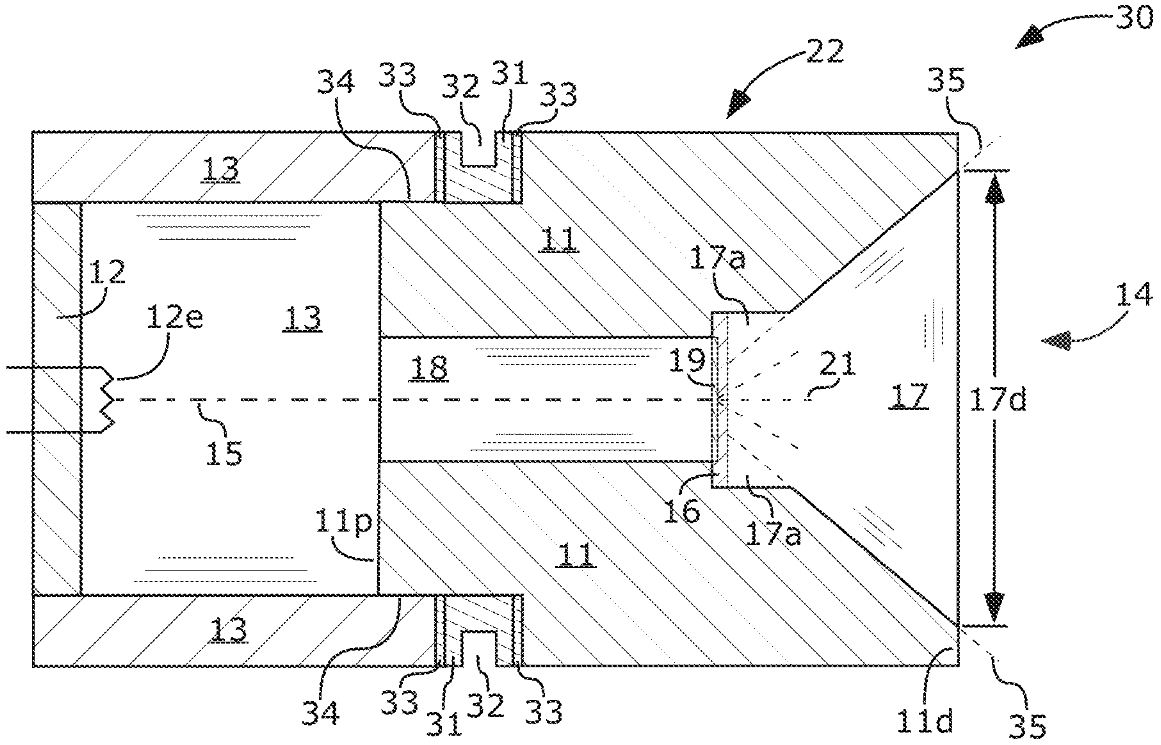

FIG. 3 is a cross-sectional side-view of a transmission target x-ray tube 30, similar to transmission target x-ray tube 10. A diameter 17*d* of a collimation-region 17, of transmission target x-ray tube 30, increases as distance from an x-ray window 16 increases.

Figure 4:
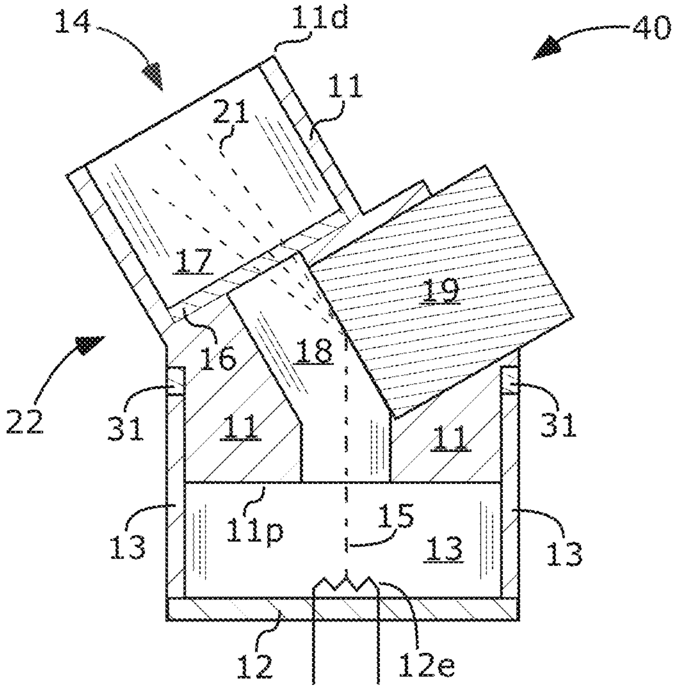

FIG. 4 is a cross-sectional side-view of a reflection target x-ray tube 40, similar to reflection target x-ray tube 20. A ring 31 encircles the collimator 11 of reflection target x-ray tube 40.

Figure 5:
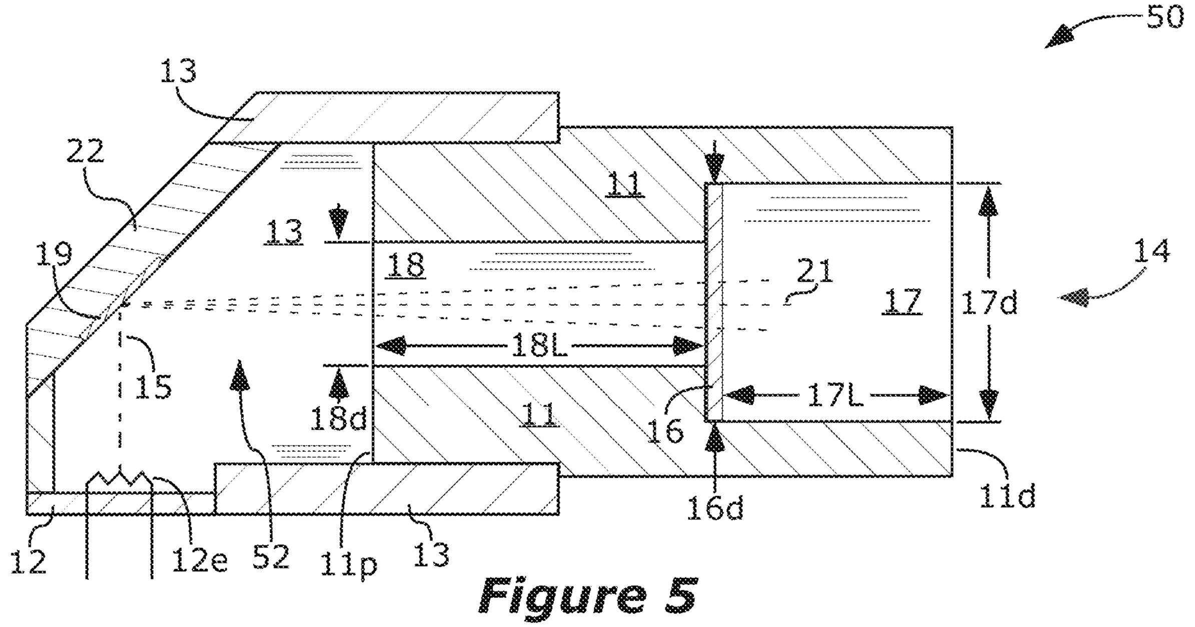

FIG. 5 is a cross-sectional side-view of a reflection target x-ray tube 50 with a collimator 11. A proximal-end 11*p* of the collimator 11 can adjoin a vacuum inside of the x-ray tube 10. A distal-end 11*d* of the collimator 11 can be exposed to and can adjoin the air. There is a gap 52 between the collimator 11 and the target material 19 of the x-ray tube 50.

Figure 6:
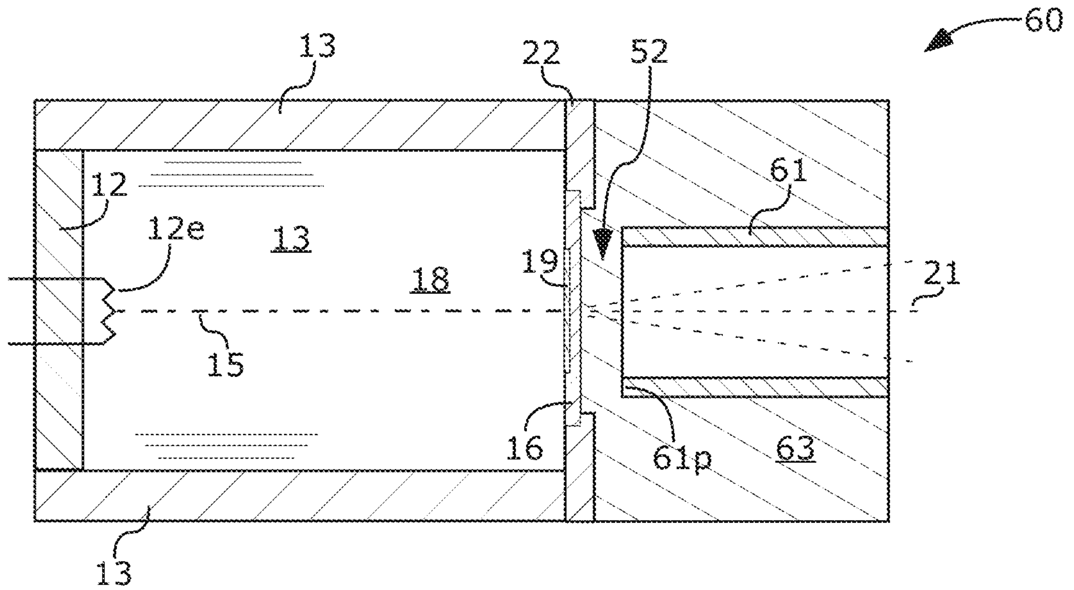

FIG. 6 is a cross-sectional side-view of a transmission target x-ray tube 60 with a collimator 61. There is a gap 52 between the collimator 61 and target material 19 of the x-ray tube 60.

Definitions. The following definitions, including plurals of the same, apply throughout this patent application.

As used herein, the term “adhesive” includes any material that can be used bond the x-ray window 16 to the collimator 11, and to form a hermetic seal between the x-ray window and the collimator 11. Example adhesives include glue, epoxy, polymer, solder, and braze.

As used herein, the term “dispersed evenly throughout” means dispersed exactly evenly; dispersed evenly within normal manufacturing tolerances; or dispersed nearly exactly evenly, such that any deviation from dispersed exactly evenly would have negligible effect for ordinary use of the device.

As used herein, the terms “on”, “located on”, “located at”, and “located over” mean located directly on or located over with some other solid material between. The terms “located directly on”, “adjoin”, “adjoins”, and “adjoining” mean direct and immediate contact.

As used herein, the term “monolithic” means seamless and continuous. A monolithic structure herein has the same material composition throughout. For example, a concrete wall, formed at a single time in a single pouring step followed by a single curing step, is monolithic. As another example, a collimator, formed at a single time from a single piece of material, is monolithic.

As used herein, the terms “integrally-joined” and “integral” mean that the integrally-joined devices are formed together at the same time, and are continuous and without seams or joints between them.

As used herein, the term “same material composition” means exactly the same; the same within normal manufacturing tolerances; or nearly the same, such that any deviation from exactly the same would have negligible effect for ordinary use of the device.

As used herein, the term “x-ray tube” is not limited to tubular/cylindrical shaped devices. The term “tube” is used because this is the standard term used for x-ray emitting devices.

DETAILED DESCRIPTION

X-ray tubes can be used in material analysis (XRD and XRF), electrostatic dissipation, nondestructive testing of material thickness, imaging, and backscatter imaging. Desirable x-ray tube characteristics include small, light, inexpensive, alignment of components during manufacture, fewer components for easier manufacture, and the ability to block x-rays emitted in undesired directions. The invention includes x-ray tubes with a collimator 11 to satisfy these needs. Each example may satisfy one, some, or all of these needs.

As illustrated in FIGS. 1-6, x-ray tubes 10, 20, 30, 40, 50, and 60 are shown comprising a cathode 12 and an anode 22 electrically insulated from one another. For example, the cathode 12 and the anode 22 can be electrically insulated from one another by an electrically insulative device 13. The electrically insulative device 13 can be a cylinder or a disk. The electrically insulative device can be made of glass or ceramic. The anode 22 can be stationary.

The cathode 12 can be configured to emit electrons 15 towards a target material 19 of the anode 22. For example, the cathode 12 can include an electron emitter 12*e*, such as a filament, that will emit electrons 15 due to high temperature and a large voltage differential. The target material 19 can be configured (e.g. by selection of material) to emit x-rays 21 out of the x-ray tube 10, 20, and 30 in response to impinging electrons 15 from the cathode 12.

As illustrated in FIGS. 1-5, x-ray tubes 10, 20, 30, 40, and 50 include a collimator 11 for collimation of the x-rays 21. The collimator 11 can be a single collimator (only one collimator in the x-ray tube). Use of a single collimator can reduce the number components, thus simplifying manufacture.

The collimator 11 can have a proximal-end 11*p* closest to the cathode 12 and a distal-end 11*d* farthest from the cathode 12. The proximal-end 11*p* can adjoin a vacuum inside of the x-ray tube 10, 20, 30, 40, and 50. The distal-end 11*d* can be exposed to and can adjoin the environment, the ambient surroundings, the atmosphere, and/or the air at an exterior of the x-ray tube 10, 20, 30, 40, and 50. The vacuum can be inside of the electrically insulative device 13. The distal-end 11*d* can extend outward from the x-ray tube 10, 20, 30, 40, and 50 as a farthest protruding device at an x-ray emission end of the x-ray tube 10, 20, 30, 40, and 50. The collimator 11 can adjoin the electrically insulative device 13 at one end and can be located at an exterior of the x-ray tube 10, 20, 30, 40, and 50 at an opposite end.

The collimator 11 can be a monolithic, integral structure. The monolithic, integral structure of the collimator 11 can have a continuous and uninterrupted heat flow path for improved heat transfer characteristics. In addition, the monolithic, integral structure of the collimator 11 can have a continuous and uninterrupted electrical path to avoid contact resistance and to allow uniform current density through the collimator 11. An aperture 14 can extend through a core of the collimator 11. The aperture 14 can be aimed for x-rays 21 to emit out of the x-ray tube 10, 20, 30, 40, and 50.

An x-ray window 16 can be mounted across the aperture 14. The x-ray window 16 can be mounted inside of the aperture 14. The x-ray window 16 can form a hermetic seal with the collimator 11. The x-ray window 16 can separate the vacuum from the air. The x-ray window 16 can include some or all of the properties (e.g. low deflection, high x-ray transmissivity, low visible and infrared light transmissivity) of the x-ray windows described in U.S. Pat. No. 9,502,206, which is incorporated herein by reference in its entirety.

In one aspect, the anode 22 can consist essentially of the collimator 11, the x-ray window 16, adhesive, and the target material 19. The adhesive can be used for mounting the x-ray window 16 to the collimator 11 and for mounting the collimator 11 to the electrically insulative device 13. In another aspect, the anode 22 can consist essentially of the collimator 11, the x-ray window 16, adhesive, the target material 19, and the ring 31 (described below). The adhesive can be used for mounting the x-ray window 16 to the collimator 11, for mounting the collimator 11 to the ring 31, and for mounting the ring 31 to the electrically insulative device 13. At least 70%, at least 80%, at least 85%, at least 90%, or at least 95% of a weight of the anode 22 can be the collimator 11.

The aperture 14 can include (a) a collimation-region 17 between the x-ray window 16 and the distal-end 11*d*, and (b) a drift-region 18 between the x-ray window 16 and the proximal-end 11*p*.

Some or all of the collimator 11 encircling the collimation-region 17 can protrude outward as a farthest protruding solid object at an x-ray emission end of the x-ray tube 10, 20, 30, 40, or 50. For example, ≥20%, ≥50%, ≥75%, ≥95%, or all of the collimator 11 encircling the collimation-region 17 can protrude outward from any other solid portion of the x-ray tube.

Each x-ray tube design can have relationship between a length 17L of the collimation-region 17 and a length 18L of the drift-region 18. The length 17L of the collimation-region 17 is measured as a shortest length between the x-ray window 16 and the distal-end 11*d*. The length 18L of the drift-region 18 is measured as a shortest length between the x-ray window 16 and the proximal-end 11*p*.

A shorter length 17L of the collimation-region 17 is preferred for increased x-ray flux and less material in the collimator; but a longer length 17L of the collimation-region 17 is preferred for a narrower x-ray beam.

A shorter length 18L of the drift-region 18 is preferred for less chance of arcing and less material in the collimator 17; but a longer length 18L of the drift-region 18 is preferred for increased x-ray shielding and reduced electron backscatter to the electrically insulative device 13.

Example relationships between the length 17L of the collimation-region 17 and the length 18L of the drift-region 18 include the following: 0.2≤18L/17L, 0.5≤18L/17L, or 1≤18L/17L. Other examples include the following: 18L/17L≤1, 18L/17L≤1.3, or 18L/17L≤1.6.

A relationship between a length 17L of the collimation-region 17 and a diameter 17*d* of the collimation-region 17 can be selected for a balance between better collimation of the x-ray beam and reduced material weight and cost. For example, 0.5≤17L/17*d*, 1≤17L/17*d*, or 1.4≤17L/17*d*. Other examples include 17L/17*d*≤1.4, 17L/17*d*≤3, or 17L/17*d*≤5. Diameter 17*d* is measured perpendicular to a longitudinal axis of the x-ray tube.

A relationship between a diameter 17*d* of the collimation-region 17, a diameter 16*d* of the x-ray window 16, and a diameter 18*d* of the drift-region 18 can be selected for improved manufacturability and improved collimation of the x-rays 21. For example, 17*d*>16*d*>18*d*. Each diameter is measured perpendicular to a longitudinal axis of the x-ray tube. If the device has different diameters in different directions, then a largest of these diameter is selected for this relationship.

With a collimator 11 as described herein, the x-ray window 16 can extend beyond the electrically insulative device 13, closer to the sample. For example, the x-ray window 16 can be located ≥0.5 mm, ≥2 mm, or ≥4 mm, beyond a farthest end of the electrically insulative device 13, measured parallel to a longitudinal-axis of the x-ray tube. The longitudinal-axis of the x-ray tube can extend from the electron-emitter 12*e* to the target material 19 at the anode 22 (i.e. parallel to the electron beam 15).

A proximal-end 11*p* of the collimator 11 adjoins a vacuum inside of x-ray tubes 10, 20, 30, 40, and 50. In contrast, in x-ray tube 60 the proximal-end 61*p* of the collimator 61 does not adjoin a vacuum. This proximal-end 61*p* adjoins material 63 instead, which could be solid or liquid. The material 63 can span a gap 52 between collimator 61 and the anode 22. The material 63 can encircle the collimator 61 and close a proximal-end 61*p* of the collimator 61.

As illustrated on transmission target x-ray tube 10 and 30 in FIGS. 1 and 3, the target material 19 can be located on the x-ray window 16. The target material 19 can adjoin the x-ray window 16. An aperture 14 of the collimator 11 can encircle the target material 19. The aperture 14 can be aimed (a) for the electrons 15 from the electron emitter 12*e* to transmit through the drift-region 18 to hit the target material 19, and (b) for generated x-rays 21 to transmit through the collimation-region 17 and out of the x-ray tube 10 or 30.

As illustrated on reflection target x-ray tubes 20 and 40 in FIGS. 2 and 4, the target material 19 (*i*) can be separate from the x-ray window 16, (ii) can be inside of the collimator 11, and (iii) can form part of a wall of the aperture 14. The aperture 14 can be aimed (a) for the electrons 15 from the electron emitter 12*e* to transmit through the drift-region 18 to hit the target material 19, and (b) for generated x-rays 21 to transmit through the collimation-region 17 and out of the x-ray tube 20 or 40.

Illustrated in FIG. 3 is a transmission target x-ray tube 30. This x-ray tube 30 can have characteristics as described above for x-ray tube 10. A shape of the collimation-region 17, however, differs between x-ray tubes 10 and 30.

In the transmission target x-ray tube 30, a diameter 17*d* of the collimation-region 17 increases as distance from the x-ray window 16 increases. The collimation-region 17 can have a conical frustum shape. The conical frustum shape can have a narrower diameter 17*d* closer to the x-ray window 16 and a wider diameter 17*d* closer to the distal-end 11*d*.

An angle 17*a* of walls of the collimation-region 17 can point to a focal spot of the electrons at the target 19. Example angles 17*a* of the walls of the collimation-region 17 include at least 20°, 30°, or 40°; and not greater than 50°, 60°, 70°, or 80°. The angle can be measured between a line 35 aligned with a face of the walls of the collimation-region 17 and a face of the x-ray window 16.

This collimation-region 17 shape can improve x-ray beam shape. Without the conical frustum shape, x-rays can pass through a corner of the distal-end 11*d* of the collimator 11. These x-rays are partially attenuated and result in an overall undesirable x-ray beam profile.

Illustrated in FIG. 4 is a reflection target x-ray tube 40. This x-ray tube 40 can have characteristics as described above for x-ray tube 20.

X-ray tubes 30 and 40 can further comprise a ring 31 encircling the collimator 11. Due to a difference of coefficients of thermal expansion between the collimator 11 and the electrically insulative device 13, the electrically insulative device 13 can crack when sealing (e.g. brazing) the two components together. Adding the ring 31 can solve this cracking problem.

The ring 31 can be located between the collimator 11 and the electrically insulative device 13. The ring 31 can be attached to the collimator 11 and to the electrically insulative device 13.

As illustrated in FIG. 3, there can be a hermetic seal 33 (a first hermetical seal) between the ring 31 and the collimator 11. There can be a hermetic seal 33 (a second hermetical seal) between the ring 31 and the electrically insulative device 13. This hermetic seal 33 can be an adhesive, such as for example a brazed joint.

Note that in FIG. 3, there is no such hermetic seal 33 between the collimator 11 and the electrically insulative device 13, and they are not hermetically sealed to other directly. Due to absence of a direct hermetic seal 33 in this location, the collimator 11 and the electrically insulative device 13 can slide past each other as they expand and contract at different rates during heating and cooling processes.

As illustrated in FIG. 3, the ring 31 can further comprise a channel 32 encircling the ring 31 at its outer face. This channel 32 can allow flexibility of the ring 31, thus further reducing stress in the electrically insulative device 13.

The ring 31 can have a coefficient of thermal expansion similar to the electrically insulative device 13. The ring 31 can store stress during heating and cooling. Without the ring 31, this stress would be stored in the electrically insulative device 13. The ring 31 can be made of a material that is more ductile than the electrically insulative device 13 and that is better able to store such stress without rupture. The ring 31 can be metallic.

The collimator 11 and the ring 31, in x-ray tubes 30 and 40, can have the following material compositions. The collimator 11 can comprise tungsten. The collimator 11 can comprise at least 50, 75, 90, or 95 weight percent tungsten.

The ring 31 can comprise cobalt, nickel, and iron. The ring 31 can be made of Kovar. The ring 31 can comprise at least 50, 75, 90, or 95 weight percent of iron, nickel, and cobalt combined. The ring 31 can comprise at least 50 weight percent iron, at least 20 weight percent nickel, and at least 10 weight percent cobalt.

Although the hermetic seal 33 and the channel 32 are not illustrated in FIG. 4, these features are applicable to x-ray tube 40. The ring 31 and the hermetic seals 33 of x-ray tubes 30 and 40 are applicable to any other x-ray tube described herein.

As illustrated on reflection target x-ray tube 50 in FIG. 5, the target material 19 can be separate from the x-ray window 16 and outside of the collimator 11. The aperture 14 can be aimed for the x-rays 21 from the target material 19 to transmit through the drift-region 18, through the collimation-region 17, and out of the x-ray tube 10.

X-ray tubes 10, 20, 30, and 40 can be relatively small and light because less shielding is required by integrating the collimator 11 with the rest of the anode 22. X-rays are generated inside of the collimator 11. The target material 19 is located inside of the aperture 14 between the proximal-end 11*p* and the distal-end 11*d* of the collimator 11. Shielding of stray x-rays is improved because the target material 19 is located inside of the collimator 11.

In contrast, in x-ray tubes 50 and 60, there is a gap 52 between the collimator 11 and the target 19. It can be harder to shield stray x-rays 21 in these x-ray tubes 50 and 60. Thus, x-ray tubes 50 and 60 might be larger and heavier than x-ray tubes 10, 20, 30, and 40. Also, there is greater risk of radiation leakage in x-ray tubes 50 and 60.

X-ray tubes 10, 20, 30, and 40 are preferred over x-ray tubes 50 and 60. X-ray tube 50 is preferred over x-ray tube 60.

The monolithic, integral collimator 11 described herein can improve manufacturability of the x-ray tubes 10, 20, 30, 40, and 50 because (a) fewer components simplifies the manufacturing process and (b) fewer components minimizes stack-up tolerance, thus resulting in a more precise final product.

In one example collimator 11, 18L=7.2 mm, 17L=6.8 mm, 17*d*=4.8 mm, and 18*d*=2.8 mm. 18L, 17L, and 17*d* are defined above. 18*d* is a diameter of the drift-region 18. In this example, an outer diameter of the collimator across most of the drift-region 18 and across the collimation-region 17 is 8.5 mm.

Materials of the collimators 11 and 61 can be selected for blocking of x-rays and high melting point. The following materials/chemical elements can be dispersed evenly throughout the collimator 11 or 61: At least one of the elements in the collimator 11 or 61 can have an atomic number ≥42 or ≥74. At least 80 weight percent of the elements in the collimator 11 or 61 have an atomic number ≥42 or ≥74. The collimator 11 or 61 can include ≥60, ≥70, or ≥85 weight percent tungsten, molybdenum, or silver. In addition to tungsten, molybdenum, or silver, the collimator 11 or 61 can include copper, nickel and copper, nickel and iron, lanthanum and oxygen, rhenium, or combinations thereof. The collimator 11 or 61 can include a weight percent copper that is ≥10% and ≤35%.

The collimators 11 and 61 described herein can be made by machining.

What is claimed is:

1. An x-ray tube comprising:

a cathode and an anode electrically insulated from one another, the cathode configured to emit electrons towards a target material of the anode, and the target material configured to emit x-rays out of the x-ray tube in response to impinging electrons from the cathode;

an electrically insulative device attached to the anode and the cathode, and electrically insulating the anode from the cathode;

a collimator (a) that is a monolithic, integral structure, (b) that has an aperture extending therethrough, and (c) that is configured to collimate the x-rays;

an x-ray window mounted across the aperture, the aperture aimed for x-rays to emit through the aperture, through the x-ray window, and out of the x-ray tube;

the collimator includes a proximal-end closest to the cathode and a distal-end farthest from the cathode, the proximal-end adjoins a vacuum inside of the x-ray tube and the distal-end adjoins air;

a ring encircling the collimator; and the ring is located between and attached to the collimator and to the electrically insulative device.

2. The x-ray tube of claim 1, further comprising:

a first hermetical seal between the collimator and the ring;

a second hermetical seal between the ring and the electrically insulative device; and no hermetical seal directly between the collimator and the electrically insulative device.

3. The x-ray tube of claim 1, wherein the aperture includes a collimation-region between the x-ray window and the distal-end, and a diameter of the collimation-region increases as distance from the x-ray window increases.

4. The x-ray tube of claim 3, wherein an angle of walls of the collimation-region is at least 30° and not greater than 60°, the angle measured between a line aligned with a face of the walls of the collimation-region and a face of the x-ray window.

5. The x-ray tube of claim 1, wherein:

the aperture includes a collimation-region between the x-ray window and the distal-end; and 0.5≤17L/17*d*, where 17L is a shortest length of the collimation-region between the x-ray window and the distal-end, and 17*d* is a diameter of the collimation-region, measured perpendicular to a longitudinal axis of the x-ray tube.

6. The x-ray tube of claim 5, wherein 17L/17*d*≤5.

7. The x-ray tube of claim 1, wherein:

the aperture includes a collimation-region between the x-ray window and the distal-end; and ≥50% of the collimation-region protrudes outward from any other solid portion of the x-ray tube as a farthest protruding solid object at an x-ray emission end of the x-ray tube.

8. The x-ray tube of claim 1, wherein:

the aperture includes a collimation-region between the x-ray window and the distal-end;

the aperture includes a drift-region between the x-ray window and the proximal-end; and 0.2≤18L/17L≤1.6, where 17L is a shortest length of the collimation-region between the x-ray window and the distal-end, and 18L is a shortest length of the drift-region between the x-ray window and the proximal-end.

9. The x-ray tube of claim 1, wherein:

a longitudinal-axis of the x-ray tube extends from an electron-emitter at the cathode to a target material at the anode; and the x-ray window is located at least 2 mm beyond a farthest end of the electrically insulative device, measured parallel to the longitudinal-axis.

10. The x-ray tube of claim 1, wherein the anode consists essentially of the collimator, x-ray window, an adhesive for mounting the x-ray window, and the target material.

11. The x-ray tube of claim 1, wherein the x-ray window forms a hermetic seal and separates the vacuum from the air.

12. The x-ray tube of claim 1, wherein at least one element in the collimator has an atomic number ≥74.

13. The x-ray tube of claim 1, wherein ≥80 weight percent of elements in the collimator have an atomic number ≥74.

14. An x-ray tube comprising:

a cathode and an anode electrically insulated from one another, the cathode configured to emit electrons towards a target material of the anode, and the target material configured to emit x-rays out of the x-ray tube in response to impinging electrons from the cathode;

an electrically insulative device attached to the anode and the cathode, and electrically insulating the anode from the cathode;

a collimator (a) that is a monolithic, integral structure, (b) that has an aperture extending therethrough, and (c) that is configured to collimate the x-rays;

an x-ray window mounted across the aperture, the aperture aimed for x-rays to emit through the aperture, through the x-ray window, and out of the x-ray tube;

the collimator includes a proximal-end closest to the cathode and a distal-end farthest from the cathode, the proximal-end adjoins a vacuum inside of the x-ray tube and the distal-end adjoins air; and the aperture includes a collimation-region between the x-ray window and the distal-end.

15. The x-ray tube of claim 14, wherein a diameter of the collimation-region increases as distance from the x-ray window increases.

16. The x-ray tube of claim 15, wherein an angle of walls of the collimation-region is at least 30° and not greater than 60°, the angle measured between a line aligned with a face of the walls of the collimation-region and a face of the x-ray window.

17. The x-ray tube of claim 14, wherein 0.5≤17L/17*d*, where 17L is a shortest length of the collimation-region between the x-ray window and the distal-end, and 17*d* is a diameter of the collimation-region, measured perpendicular to a longitudinal axis of the x-ray tube.

18. The x-ray tube of claim 17, wherein 17L/17*d*≤5.

19. The x-ray tube of claim 14, wherein ≥50% of the collimation-region protrudes outward from any other solid portion of the x-ray tube as a farthest protruding solid object at an x-ray emission end of the x-ray tube.

20. The x-ray tube of claim 14, wherein:

the aperture includes a drift-region between the x-ray window and the proximal-end; and 0.2≤18L/17L≤1.6, where 17L is a shortest length of the collimation-region between the x-ray window and the distal-end, and 18L is a shortest length of the drift-region between the x-ray window and the proximal-end.

* * * * *